Figure 1:
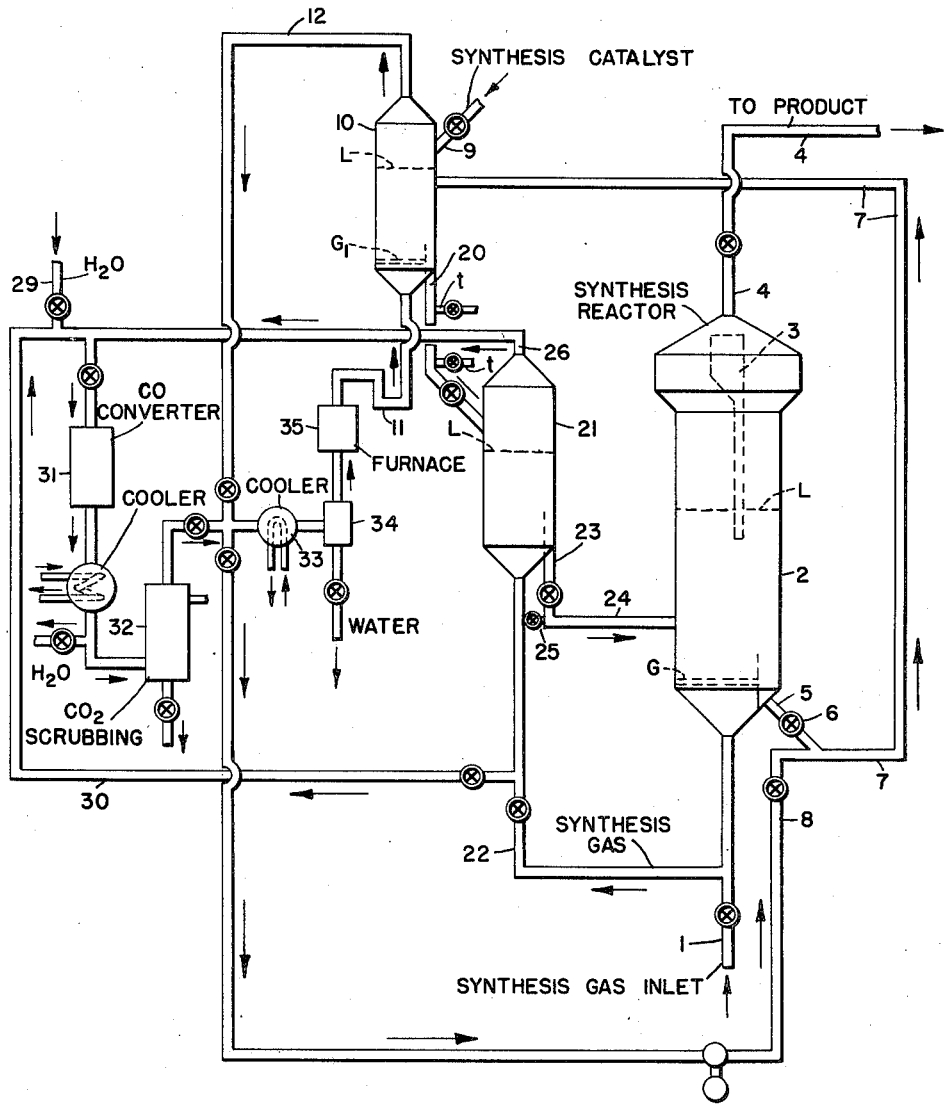

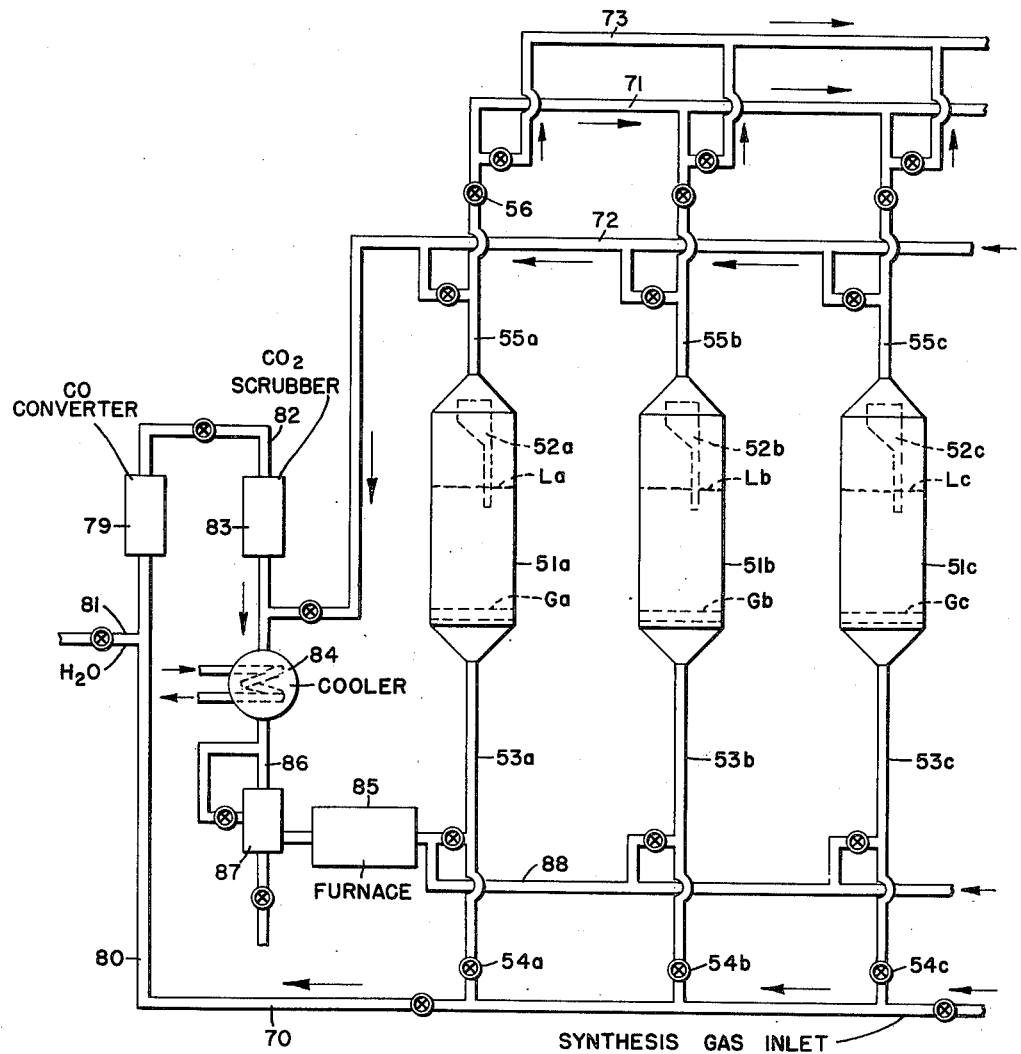

Patented July 10, 1951

2,560,345

UNITED STATES PATENT OFFICE 2,560,345

PRETREATMENT OF CATALYST FOR HYDROCARBON SYNTHESIS

Charles E. Hemminger, Westfield, N. J., assignor to Standard Oil Development Company, a corporation of Delaware Application December 23, 1947, Serial No. 793,368

4 Claims. (Cl. 260—449.6)

My present invention relates to the novel features hereinafter fully disclosed in the following specification, the drawings forming a part thereof, and the claims.

It is a matter of record to synthesize hydrocarbons and oxygenated hydrocarbons by reducing carbon monoxide with a hydrogen-containing gas in the presence of a suitable catalyst such as cobalt or iron employed with or without supports and/or promoters.

In the early work in the field of hydrocarbon synthesis, the catalyst employed was one containing cobalt carried on a support such as kieselguhr and promoted with a relatively small amount of thoria. This process, conducted at temperatures of around 400° F., produced in addition to normally gaseous hydrocarbons, normally liquid hydrocarbons and paraffin wax. The normally liquid products produced in employing cobalt as the catalyst were for the most part straight chain paraffinic, and the gasoline fraction, for example, had a very low octane number. Ordinarily, the ratio of hydrogen to carbon monoxide in this process is 2 to 1.

In the process employing iron as the catalyst, the temperatures are higher than those where cobalt is the catalyst, but in particular the ratio of hydrogen to carbon monoxide in the feed is lower than in the case where the catalyst is cobalt. The gasoline fraction produced using iron as the catalyst under proper conditions of operation is vastly superior to that where cobalt is employed, the said gasoline fraction derived from the process having an ASTM octane number of 80 with after treatment, e. g., with bauxite at elevated temperatures. One difficulty, however, which has been encountered in employing the iron catalyst, particularly employing the iron in powdered form in a fluid catalyst reactor, is that the carbonization of the catalyst occurs at a high rate which has serious detrimental effects which will be explained presently. But, in the first place, it is pointed out that by carbonization of the catalyst I refer to the deposition of carbonaceous material and/or elemental carbon internally and on the external catalyst surfaces.

When the iron catalyst is prepared in the form of a powder having a particle size of from, say, 1 to 200 microns, it is to be noted that the catalyst is not 100 per cent metallic iron but is associated with a promoter such as potassium carbonate and small amounts of other substances such as siliceous material, alumina, etc.

During the hydrocarbon synthesis process, the carbon monoxide and hydrogen not only contact the external surface of the iron but actually penetrate to the interior of the individual particles and as the process proceeds carbonaceous deposits, including elemental carbon, form within the catalyst, and this deposition within the catalyst usually occurs along lines of structural weakness, causing a weakening of the catalyst, so that as the synthesis operation proceeds the catalyst physically disintegrates into particles of such a size, in extreme cases, that it is no longer possible to maintain the catalyst in a well fluidized condition. By well fluidized, I mean a state in which the catalyst particles are suspended in dense phase suspension in a reaction zone through which the gasiform reactants pass but also in which the gasiform material exits from the reaction zone free of the major portion of the catalyst, the latter remaining in the reaction zone, while the gasiform products issue therefrom with a minimum quantity of catalyst. Stated otherwise, when the process is operating properly, an effective separation of catalyst from the gasiform material occurs in the reaction zone. But, for the reasons hereinbefore given, due to the physical disintegration of the catalyst caused by the carbonization, serious difficulties have been encountered in attempting to prevent loss of catalyst from the dense phase bed for the fines thus produced tend to be blown out of the reactor with the vapors and/or gases.

I have now found that if the catalyst contains a substantial amount of iron carbide, the tendency to undergo physical disintegration or fragmentation is minimized or virtually avoided. The iron carbide to which I refer is not a definite compound but is a mixture of $Fe_3C$, $Fe_2C$, etc., in which mixture $Fe_2C$ predominates, the latter having a Curie point of 260° C.

In treating the powdered iron catalyst to convert a portion (25 to 50% by weight) of the iron to iron carbide, I proceed as follows: The powdered iron containing promoter and impurities is treated with hydrogen and synthesis gas at substantially the reaction temperature of 550° to 750° F., at lower than reaction pressures and during a period of from 0.5 to 2 hours, the operation preferably being performed in the fluid solids type of process. The catalyst is treated according to the foregoing procedure while the concentration of $CO_2$ is maintained within prescribed limits, the main reaction involved being the following:

$2CO + 2Fe$ 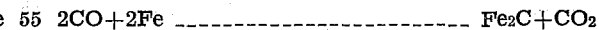 $Fe_2C + CO_2$

When the reaction is complete, the catalyst contains from 2 to 5 weight per cent carbon as carbide when about 25 to 50% of the iron is present as the iron carbide, $Fe_2C$.

The preferred operations are to treat fresh or used catalyst (containing substantial amounts of iron oxide) first with hydrogen at pressures lower than synthesis pressure but at about synthesis temperatures or higher so as to reduce the oxygen on the catalyst to the prescribed limits in the order of 0 to 10 parts of oxygen per 100 parts of iron by weight. It has been found that the oxygen content of the catalyst in the reactor is critical in maintaining the desired feed conversion, the values ranging from 5 to 20 parts of oxygen per 100 parts of iron by weight, depending on factors such as temperature, feed $H_2/CO$ ratio, pressure and catalyst type. Since the catalyst is slowly oxidized during the synthesis, it is desirable to hydrogenate the used catalyst to maintain the necessary oxygen content. Ordinarily, the fresh iron catalyst is available in oxidized state, e. g., as ores, burnt pyrites ash, fused catalyst, etc. Also during the use of the iron catalyst in the hydrocarbon synthesis reaction, the iron normally undergoes oxidation. In the case of fresh or new catalyst, which is in the form of metallic iron, the reducing referred to need not, of course, be performed. Such a fresh catalyst would be, say, an iron product subjected to sintering in an atmosphere of hydrogen.

After the reduction step (where required), the catalyst is treated at about the synthesis temperature with synthesis gas so as to convert sufficient iron to iron carbide, $Fe_2C$, so that 25 to 50% of the iron is in the carbide form, before being introduced into the synthesis reactor.

These catalyst pretreating steps are necessary with the fresh iron oxide catalyst and also are carried out on used catalyst since in normal operations the catalyst slowly loses carbide carbon and becomes oxidized. Consequently, after 150 to 500 hours of use, the catalyst is removed from the reactor and subjected to the foregoing treatment. These steps may be accomplished by several means, two of which are described below.

A continuous method of treating the fresh and/or used catalyst in conjunction with the fluid hydrocarbon synthesis reactor is shown in Figure I. The synthesis gas in line 1, which is fed into reactor 2, is the fresh feed synthesis gas having a hydrogen to carbon monoxide ratio of 1 to 2 mols of hydrogen per mol of carbon monoxide, preferably 1.5 mols of hydrogen per mol of carbon monoxide, and recycle gas from the product recovery system (not shown). A typical analysis of the mixed gas in line 1 is 20% carbon monoxide, 20% carbon dioxide, 42% hydrogen, 10% methane, 7% ethane, and higher hydrocarbons. This gas passes up through the grid G of reactor 2 and is conducted through a suspended mass of catalyst in reactor 2 at a superficial velocity of the order of 0.5 to 1.5 feet per second calculated at the operating conditions of the reactor. By superficial velocity I refer to that velocity were there no catalyst in the reactor. The catalyst is reduced ground iron oxide promoted with various types of potassium compounds and fills the reactor with a dense fluidized mass having an upper level L. The catalyst should have a particle size of from 0 to 200 microns with 50 to 60% having a size of from 40 to 80 microns. Catalyst entrained in the vapors is recovered by "cyclones" 3 and returned to the dense phase. The desired conversion occurs under known proper conditions of temperature, pressure and contact time, and the reactants emerge from the dense phase and pass toward the product outlet 4. Heavy hydrocarbons and water are separated in a recovery system (not shown), part of the separated gas being rejected and the remainder recycled to line 1 as already indicated. The operating conditions of the reactor are about 550° to 750° F., 200 to 600 pounds per square inch gauge, and about 10 to 40 cubic feet of carbon monoxide (standard cubic feet) per pound of catalyst in the reactor per hour.

The fresh synthesis catalyst, which is usually an iron oxide promoted with various forms of potassium salts so that it contains from 1.3 to 1.5 parts by weight of potassium as the oxide, per 100 parts of iron as the oxide, is fed into reducing vessel 10 through line 9. A lock hopper or standpipe may be employed in line 9 to increase the pressure therein to the operating pressure of vessel 10, which is about 100 to 150 pounds per square inch less than the pressure in reactor 2. Vessel 10 is a fluid reactor with a grid G and the iron oxide is in dense phase suspension in gasiform material. In this vessel 10 the catalyst is reduced by hydrogen introduced via line 11. Gas is withdrawn from vessel 10 via line 12 and recycled to the vessel 10 through line 11, after cooling in cooler 33 and water removal in separator 34. The hydrogen is heated in furnace 35 to a temperature such that the temperature in vessel 10 is approximately the same as, or slightly higher than, that prevailing in reactor 2. The size of the reducer 10 is such that the catalyst may be maintained in reducer 10 for 3 to 20 hours, depending on the type of catalyst.

Hydrogen for the reduction is produced by feeding synthesis gas in line 1 through lines 22 and 30 to the converter 31 in which the carbon monoxide therein is reacted with water added via line 29 to give hydrogen and carbon dioxide. The products of this reaction are reaction are withdrawn from the converter 31, discharged (after cooling) into a conventional carbon dioxide scrubber 32, (e. g., containing aqueous ethanolamine). The hydrogen substantially freed of water and carbon dioxide is withdrawn from the scrubber 32 and commingled with the recycled hydrogen in line 12. This particular method of making hydrogen is well known.

The reduced catalyst in reducer 10 is introduced into carbiding vessel 21 through a standpipe 20 (carrying fluidizing gas taps $t$). Synthesis gas is introduced into the carbiding vessel 21 through line 22, and 25 to 50% of the iron is converted to iron carbide, $Fe_2C$. The temperature employed is about the same as that existing in reducer 10, the pressure about the same as in reducer 10 and the retention time of the catalyst in said vessel 21 is of the order of ½ to 1 hour. Spent carbiding gas is withdrawn through line 26 and may be passed, at least in part, to converter 31. Longer times will give excessive production of carbon. The treated catalyst in vessel 21 is introduced to reactor 2 by means of standpipe 23 (carrying gas taps $t$) which should be of sufficient length to increase the pressure to that in reactor 2. The catalyst is introduced into reactor 2 through line 24 with injecting synthesis gas, through line 25.

In order to repeat the treatment, used catalyst is removed from reaction vessel 2 through standpipe 5 (carrying gas taps not shown), controlled by valve 6, and conveyed through line 7 in carryign gas from line 8, which gas is hydrogen. The catalyst is carried in line 7 to reduction vessel 10 which is in an elevated position with respect to reactor 2, so that in flowing through the different standpipes already indicated the catalyst in vessel 10 may flow by gravity to vessel 2 which is at a higher pressure than that prevailing in vessel 10. As already stated, the recirculation rate of catalyst through vessels 2, 10 and 21 should be sufficiently rapid that the residence time of the catalyst in reactor 2 is from 150 to 500 hours.

In Figure II, the same operations are carried out in a discontinuous manner where multiple reactors are employed, 51a, 51b, 51c, etc. the same are employed intermittently to reduce catalyst, or carbide the catalyst, or onstream in the hydrocarbon synthesis. These reactors have grids $G_a$, $G_b$, $G_c$, etc., and contain catalyst of the same type already described up to levels $L_a$, $L_b$ and $L_c$ which are retained in the reactors by "cyclones" 52a, 52b, 52c, etc. The synthesis gas (or hydrogen) is introduced into the reactors through inlet lines 53a, 53b, 53c, etc., and vapors or gases are removed through exit lines 55a, 55b and 55c. While only three reactors are illustrated, it is understood that any number greater than three may be employed. As indicated, and as will appear more fully hereinafter, the said reactors are employed in rotation for reducing catalyst, carbiding it or in carrying out the actual hydrocarbon synthesis. In this illustration, reactor 51a is used for reduction while 51b is employed to carbide the catalyst and 51c and in the other reactors the synthesis is taking place.

The catalyst in 51a may be fresh catalyst introduced by manifolds, not shown, or used catalyst from a previous synthesis operation. Hydrogen is produced by taking a stream of synthesis gas (fresh feed and recycle) which is taken from line 79 and introduced into carbon monoxide converter 79 by means of line 80. Water is introduced through line 81 and the carbon monoxide is reacted with the water to hydrogen and carbon dioxide. The gases are then conveyed by line 82 to carbon dioxide scrubber 83 to remove the carbon dioxide. The gases are then fed through cooler 84 and line 86 to furnace 85 and manifold 88 which is connected to the different reactor inlet lines 53a, 53b, 53c, etc. The hydrogen in this case is introduced to reactor 51a through line 53a by opening the proper valve. The catalyst in 51a is subjected to reduction as in the previous example except that the pressure need not be closely similar to the reaction pressure. In fact, pressures of the order of 50 to 100 pounds per square inch are preferable. The gas leaves the reactor through line 55a and, by opening the suitable valve, is introduced into the manifold 72 which is also connected to the reactor outlet in lines 55a, 55b, 55c, etc. The gas in line 72 is passed through cooler 84 and water is removed through separator 87 and the gas recycled to reactor 51a through furnace 85. This reduction is continued until the desired oxygen content is obtained when the valves to manifolds 88 and 72 are closed and the valves to manifolds 70 and 71 are opened. Then this reactor would be subjected to carbiding as will be described below for reactor 51b.

Reactor 51b is subjected to carbiding by opening the necessary valve to connect the synthesis manifold 70 with the inlet line 53b. The gases are removed from the reactor by opening the necessary valve to connect exit line 55b to manifold 71. The synthesis gas is passed through the reactor 51b for from ¼ to 10 hours at a pressure of the order of 25 to 100 pounds per square inch and a temperature similar to reaction temperature so as to convert from 30 to 60% of the iron to iron carbide. The spent carbide gas in manifold 71 may be recompressed as recycle gas to the synthesis or may be introduced into manifold 70 as a gas source for production of hydrogen.

After completion of carbiding in reactor 51b, the reactor is then subjected to synthesis conditions as will be illustrated for reactor 51c. The inlet line 53c is connected with synthesis gas manifold 70 by opening the appropriate valve and the gas is released through line 55c which is connected with product gas line 73. The gas in line 73 is introduced into a product recovery system where water and heavy hydrocarbons are removed and a part of the lower molecular weight gas is rejected from the system and the remainder is recycled into the reactors by introduction into line 70.

The benefit of precarbiding and maintaining a carbide content of 25 to 50% based on the iron content of the catalyst in the synthesis reactor results in considerably less carbon deposition on the catalyst during synthesis and considerably less catalyst disintegration. For 650° F. operation and a hydrogen partial pressure of 200 pounds, it has been found that the following percentages of the carbon monoxide which reacts to hydrocarbons, is found as carbon associated with the catalyst:

| Per Cent Iron Carbide | Per Cent CO to Carbon |
| --- | --- |
| 0–10 | 0.4 |
| 10–20 | 0.25 |
| 20–30 | 0.05 |
| 30–50 | 0.04 |

When the per cent of converted carbon monoxide going to carbon is greater than 0.1%, the rate of carbon deposition is such that the catalyst disintegrates very rapidly, giving large quantities of 0–10 micron particles. If this fine catalyst is formed, the fluidization property is greatly impaired and the catalyst is apt to be blown out of the reactor. However, when over 30% of the iron in the catalyst is in the form of iron carbide, the disintegration rate is minor, and catalyst lives of over 500 hours have been demonstrated in pilot plants. By catalyst life, I mean a state wherein the catalyst is active and adapted for fluidization.

An additional advantage to this treatment of the catalyst is that wax deposits are removed from used catalyst. It is to be understood that the term "wax" describes heavy hydrocarbons which are volatilized with difficulty. Without the removal of the wax by hydrogenation, the wax slowly collects on the catalyst and gives agglomeration and formation of balls as large as $\frac{1}{32}''$ which again impairs the fluidization characteristic of the catalyst. This is especially true if pressures are increased above 250 pounds per square inch, which pressures are desirable to give high hydrogen partial pressures, which in turn suppress the deposition of carbonaceous material on the catalyst. For example, temperatures as high as 650° F. are necessary to prevent this balling of the catalyst caused by wax deposition when a pressure of 600 pounds per square inch is employed in the synthesis zone. The hydrogen treatment of the spent catalyst allows operations at temperatures below 650° F., e. g., of the order of 575° F., at 600 pounds per square inch pressure, when more favorable product distribution is obtained and the rate of carbon deposition is lower.

A further advantage of the hydrogen treatment is that the sulfur on the catalyst is reduced. Sulfur is a catalyst poison, and a less stringent specification for sulfur, say of the order of 15 to 25 grains per 1000 cubic feet of gas, may be tolerated because accumulation of the sulfur on the catalyst is prevented by the hydrogenation of the catalyst as hereinbefore described.

It should be pointed out that during this hydrocarbon synthesis reaction a high hydrogen partial pressure of at least 100 to 150 pounds per square inch gauge should be maintained in the reactor. If the hydrocarbon synthesis plant is brought up to pressure with synthesis gas (carbon monoxide plus hydrogen) containing, of course appreciable amounts of carbon monoxide, the catalyst will be exposed to conditions which will deposit an excessive amount of carbon. To avoid this carbon deposition, while the reactor is being brought up to pressure, it is advisable that the precarbided catalyst in the reactor be first contacted with hydrogen and pressure built up quickly with hydrogen until the reactor is brought up to operating pressure of, say, 400 to 800 pounds per square inch with the hydrogen containing less than 2% of carbon monoxide. This gas is circulated through the gas recovery equipment and recycled to the reactor after being heated with steam. The synthesis gas is then fed quickly into the reactor so that, as the temperature of the catalyst is raised from 400° to 600° F. or over, the catalyst is not exposed to hydrogen partial pressure of less than 150 pounds per square inch.

To recapitulate briefly, I have found that the selectivity and activity of the catalyst may be maintained, as well as the suppression of inordinately large amounts of carbonaceous material on the catalyst, during the hydrocarbon synthesis process if the catalyst is withdrawn from the reactor and first reduced with hydrogen so that the oxygen content of the catalyst is from 0 to 10%.

The iron catalyst in the reactor, under normal operating conditions, undergoes oxidation. The first step, therefore, according to my process in reconditioning the catalyst, is to reduce it with hydrogen to the extent indicated. Thereafter, the catalyst is treated at about the same temperature as that existing in the reaction zone, with synthesis gas, whereupon the catalyst is converted to a mixture of metallic iron and iron carbide. The thus carbided catalyst is then charged to the reactor, and tests have shown that this catalyst may be employed for an extended period of time and that it will have good activity, selectivity, and that severe fragmentation and loss of fluidizing characteristics of the powdered iron catalyst will have been avoided.

It is also important to note that when catalyst is withdrawn from the reactor it is insufficient to merely hydrogenate it and return it to the reactor, for it should also be treated with a synthesis gas to recarbide the same.

What I claim is:

1. In the method of synthesizing hydrocarbons and oxygenated hydrocarbons by reacting together a carbon monoxide and hydrogen in contact with a fluidized mass of iron catalyst at a synthesis temperature in the range of from about 550°–750° F. and while under superatmospheric pressure, the improvement resulting in maintaining the catalyst at a high activity level and at the same time repressing the tendency of the catalyst to undergo fragmentation which comprises first reducing an oxygen-containing iron catalyst with hydrogen to an oxygen content of about 0–10% by weight of the iron, then treating said reduced catalyst with fresh feed synthesis gas containing carbon monoxide and hydrogen in which there are from 1–2 mols of hydrogen per mol of carbon monoxide at a temperature of the same order as said synthesis temperature and at a pressure substantially lower than said synthesis pressure for a time sufficient to carbide said catalyst and to convert about 20–50% by weight of its iron content into a mixture of iron carbides, in which the carbide $Fe_2C$ predominates and then contacting said carbided catalyst with said synthesis gas at said synthesis temperature and pressure.

2. The method of claim 1 in which said reducing, carbiding and contacting steps are carried out alternatingly in said order in a single reaction zone.

3. The method of claim 1 in which said reducing, carbiding and contacting steps are carried out in separate reducing, carbiding and contacting zones through which said catalyst flows in this order.

4. The method of claim 1 in which said contacting step is carried out at a hydrogen partial pressure of at least 100–150 lbs. per sq. in.

CHARLES E. HEMMINGER.

REFERENCES CITED

The following references are of record in the file of this patent:

UNITED STATES PATENTS

| Number | Name | Date |
|---|---|---|
| 2,231,990 | Dreyfus | Feb. 18, 1941 |
| 2,251,554 | Sabel | Aug. 5, 1941 |
| 2,369,548 | Elian | Feb. 13, 1945 |
| 2,409,235 | Atwell | Oct. 15, 1946 |
| 2,437,051 | Sensel | Mar. 2, 1948 |
| 2,445,795 | Millendorf | July 27, 1948 |
| 2,445,796 | Millendorf | July 27, 1948 |
| 2,449,071 | Hawk et al. | Sept. 14, 1948 |

OTHER REFERENCES

The Mechanism of the Synthesis of Hydrocarbons from Water Gas, S. R. Craxford and E. K. Rideal Chemical Society Journal (London), pages 1604–1614, July–December 1939.